United States Patent [19]
Bontempi et al.

[11] 3,891,192
[45] June 24, 1975

[54] PRE-MIXER FOR ALIMENTARY PASTE

[75] Inventors: Ignatius Bontempi, Douglaston; Peter Giemisch, Central Islip, both of N.Y.

[73] Assignee: De Francisci Machine Corporation, Brooklyn, N.Y.

[22] Filed: Apr. 24, 1974

[21] Appl. No.: 463,724

[52] U.S. Cl............................ 259/110; 259/DIG. 16
[51] Int. Cl.²............................................ B01F 7/08
[58] Field of Search......... 259/192, 191, 193, 9, 10, 259/97, 109, 110, 25, 26, 45, 46, DIG. 16; 425/207, 208; 100/145

[56]         References Cited
            UNITED STATES PATENTS
2,587,127    2/1952  Erickson............................... 259/10
2,731,247    1/1956  Hudry................................... 259/97
3,168,291    2/1965  Knoedler............................... 259/97
3,570,588    3/1971  Wheeler................................. 259/9
3,652,062    3/1972  Baker.................................... 259/9

*Primary Examiner*—Robert W. Jenkins
*Attorney, Agent, or Firm*—Darby & Darby

[57]            ABSTRACT

A pre-mixer for mixing alimentary paste product ingredients into a homogeneous mixture is described. The premixer includes a unitary housing through which the paste product ingredients are mixed and conveyed, and a longitudinally extending shaft driven at a relatively high rotational speed. A solid helical paddle is formed on the surface of the shaft at the input end of the shaft followed by a plurality of paddles in the shape of helical segments along the central portion of the shaft. A further plurality of paddles in the shape of helical segments which are pitched in the opposite direction from the first plurality of paddles are formed on the output end of the shaft to prevent clogging of the pre-mixer housing.

5 Claims, 6 Drawing Figures

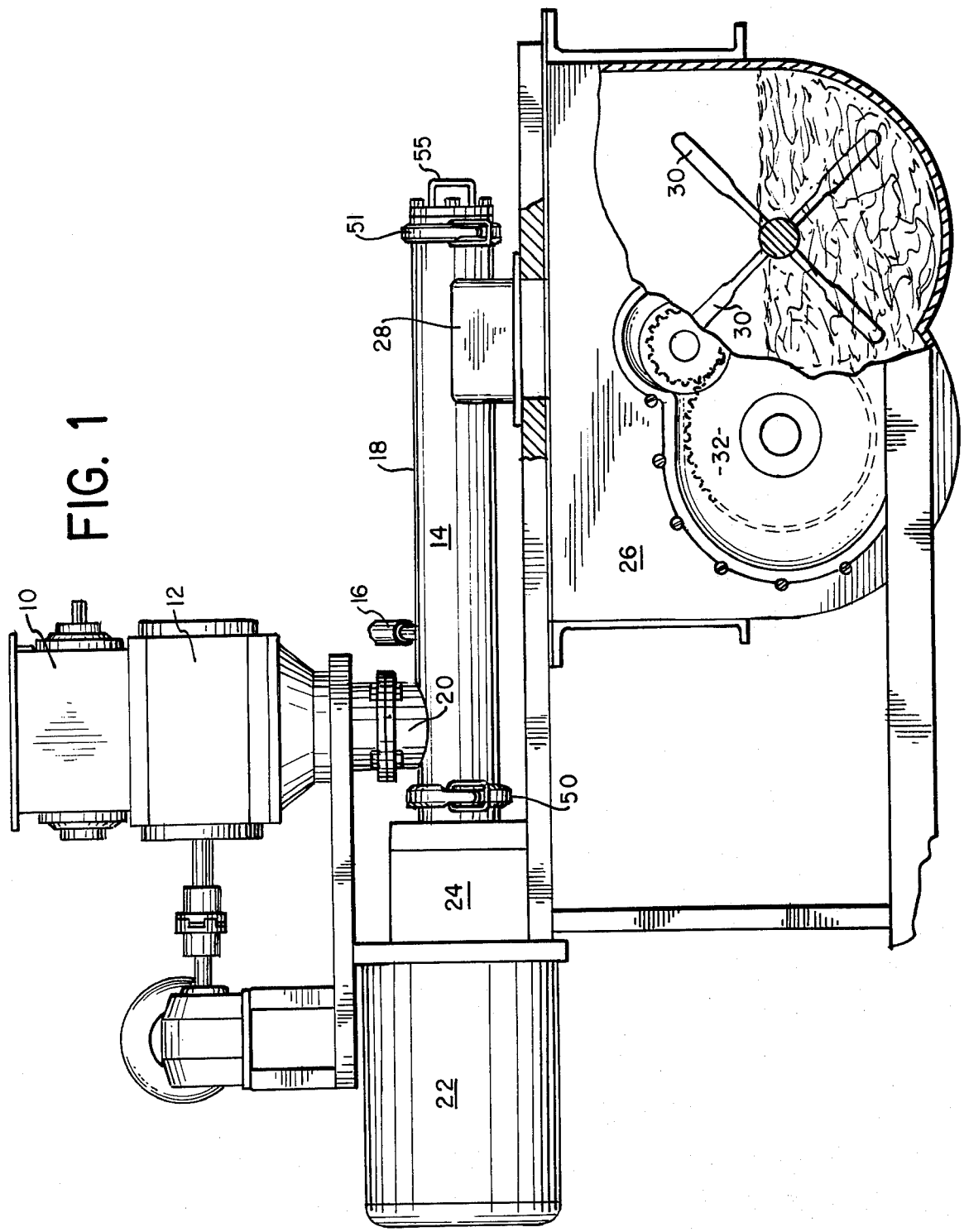

PRE-MIXER FOR ALIMENTARY PASTE

BACKGROUND OF THE INVENTION

This invention generally relates to apparatus for producing alimentary paste which is composed of a mixture of flour and water, and in some instances eggs. Products made from alimentary paste include spaghetti, lasagna and macaroni.

Traditionally, alimentary paste has been made by pouring eggs and flour into a large vat, adding water, mixing the contents of the vat with large paddles into a homogeneous mixture and working or kneading the mixture into a uniform consistency. One problem with this method is the length of time the ingredients must be mixed in order to achieve a homogeneous mixture of uniform consistency. This results from the fact that the ingredients are placed in the vat in their raw, uncombined form and require a high degree of mixing before they are blended into a homogeneous mixture, and also from the fact that the mixing paddles must be operated at a relatively slow speed (approximately 40 r.p.m.) in order to work or knead the mixture to a uniform consistency. If the ingredients are thoroughly mixed into a homogeneous mixture, specks of flour, commonly referred to as "white specks", appear in the alimentary paste.

SUMMARY OF THE INVENTION

The present invention provides a pre-mixer device which is adapted to be used with a traditional mixer or blender. The pre-mixer performs the function of initially mixing the ingredients so that they are homogeneous before they are introduced into the mixer or blender which then needs only knead the mixture so that it is of uniform consistency. The amount of time which the mixture must remain in the mixer or blender is, therefore, substantially reduced and the occurrence of flour specks in the alimentary paste is reduced. With the addition of the pre-mixer, the mixer or blender can be used solely for working or kneading the paste.

In order to achieve a homogeneous mixture of the ingredients in a relatively short time, the pre-mixer is operated at a speed of approximately 1200 r.p.m. Also, the pre-mixer shaft is easily removable from the pre-mixer housing so that it can be cleaned frequently and returned to service quickly. These somewhat opposing requirements introduce numerous problems which are solved by the pre-mixer of this invention.

Firstly, the high speed at which the pre-mixer is operated causes severe vibrations in the pre-mixer assembly. A part of the solution to the vibration problem is to provide a unitary housing for the pre-mixer shaft.

Another feature of the pre-mixer of this invention is that the mixing paddles are positioned on the mixing shaft so that they tend to reduce the flow of the mixture through the pre-mixer housing while enhancing the mixing of the ingredients.

Structural features and the complete nature of the pre-mixer of this invention will become apparent from the ensuing specification and the appended claims in which the invention is defined, particularly when taken in conjunction with the accompanying illustrative drawings setting forth a preferred embodiment of the invention.

BRIEF DESCRIPTION OF THE DRAWINGS

FIG. 1 is a schematic view of an alimentary paste handling machine with the mixer housing partially cut away;

DESCRIPTION OF A PREFERRED EMBODIMENT

Figure 2A:
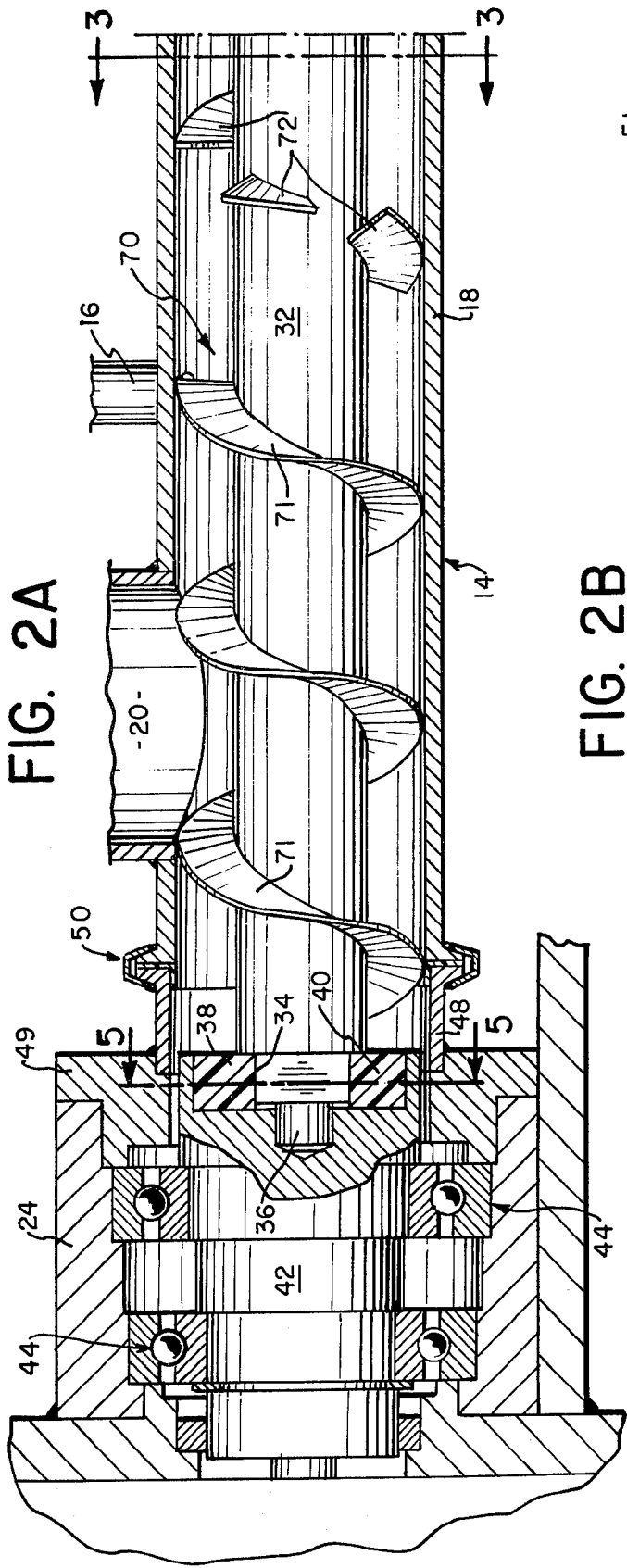
FIG. 2A is a cross-sectional view of a portion of the pre-mixer of this invention up to the line A—A.

Referring now in more detail to the drawings, a typical alimentary paste handling machine with the pre-mixer of this invention attached is illustrated generally in FIG. 1. The alimentary paste ingredients are poured into a hopper 10 which is mounted over a metering mechanism 12 which automatically measures the amount of and the frequency with which the alimentary paste ingredients are transmitted to the pre-mixer 14. The metering mechanism is well known to those skilled in the art and operates on a time basis so that a measured amount of the paste product ingredients is transmitted to the pre-mixer at a certain rate. Water is introduced into the pre-mixer through a port 16 in the pre-mixer housing 18. The paste product ingredients are transmitted from the metering mechanism 12 to the pre-mixer through a conduit 20 which connects with an aperture in the pre-mixer housing 18. The conduit 20 is separable into two parts which are connected during normal operation.

The pre-mixer is driven by a motor which is located within the motor housing 22. The output of the motor is connected to the pre-mixer shaft by a housing member which is rotatably supported by a series of bearings located within the bearing housing 24.

After the paste product ingredients have been mixed in the pre-mixer 14 and conveyed along its length (from left to right in FIG. 1), the homogeneous mixture is transmitted to the mixer or blender 26 through a conduit 28 which is connected to an aperture in the pre-mixer housing 18 and which leads to the mixer 26. The mixer 26 is composed of a large vat having a set of mixing paddles. In FIG. 1, one of the set of mixing paddles 30 is illustrated. The other mixing paddle (not shown) is positioned adjacent to and parallel with the first mixing paddle 30. Both mixing paddles are driven by a gear mechanism 32 which is driven by a motor (not shown) in a manner well known to those skilled in the art. As previously mentioned, the mixer or blender 26 performs the function of working or kneading the homogeneous mixture of paste product ingredients which are transmitted from the pre-mixer into a mixture of uniform consistency.

Figure 5:
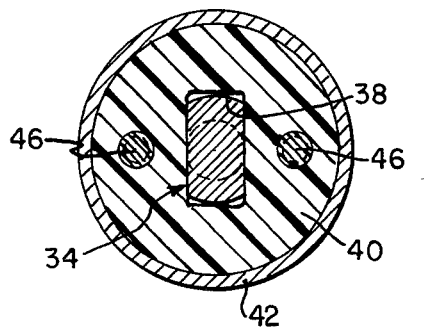
FIG. 5 is a cross-sectional view of the keyway for the pre-mixer shaft illustrated in FIG. 2A taken along the lines 5—5.

Referring now to FIG. 2A, the pre-mixer 14 includes a generally cylindrical, longitudinally extending shaft member 32 preferably composed of stainless steel. The left-hand portion of the shaft is machined into a generally rectangular shape 34 having a pointed cylindrical member 36 extending from the rectangular portion 34. The rectangular portion 34 is located within a correspondingly shaped rectangular keyway 38 which is formed in a bushing 40 which is positioned within and connected to another bushing member 42. Bushing 42 is preferably composed of stainless steel and is supported by the bearing assembly, generally designated 44 in FIG. 2A. The bushing member 42 is directly connected to the output of the driving motor shaft. The bushing 40 in which the rectangular aperture 38 is formed is preferably composed of plastic, such as for example Teflon. The plastic bushing reduces the wear of the stainless steel shaft 32 on the stainless steel bushing 42. The cylindrical projection 36 acts as a locating member for the keyway 38. The bushing 40 is attached to the bushing 42 by screw members 46, as illustrated in FIG. 5.

One advantage of the structure described above is the simplicity with which the pre-mixer shaft 32 can be disconnected from the motor drive assembly for cleaning purposes by merely pulling the shaft to the right out of the keyway 38. After the shaft has been cleaned, it is inserted into the pre-mixer housing, the rectangular end portion of the shaft is positioned within the rectangular keyway of the bushing 40, and the pre-mixer shaft is ready for operation.

Figure 2B:
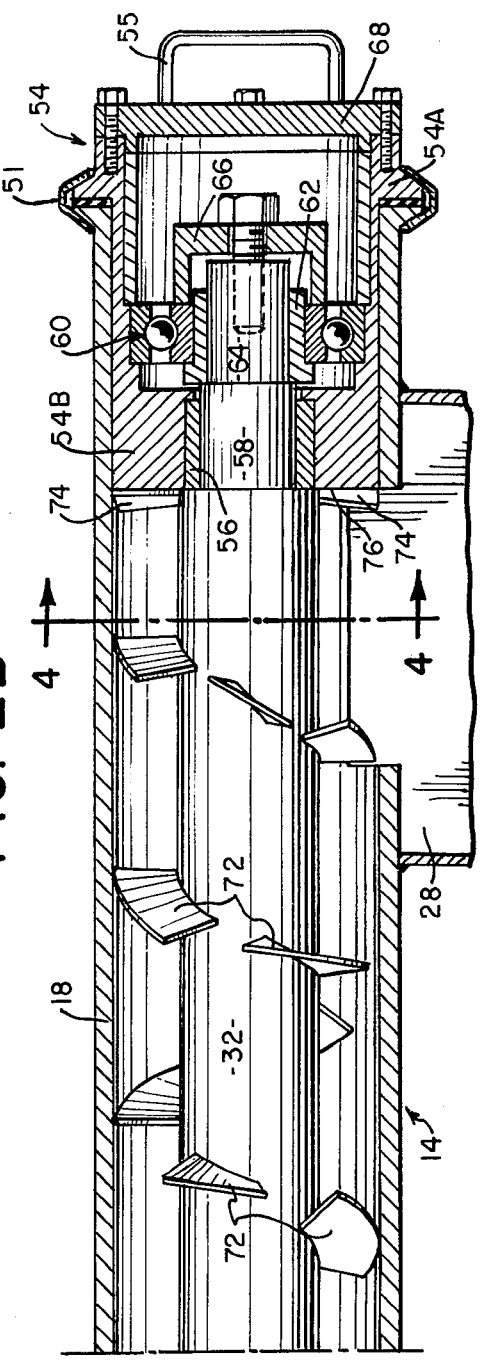
FIG. 2B is a cross-sectional view of the remaining portion of the pre-mixer of this invention beginning with the line A—A.

The pre-mixer housing 18 consists of a longitudinally extending cylindrical member also preferably composed of stainless steel. The housing performs the dual function of containing the paste product ingredients during the pre-mixing operation and, in cooperation with the pre-mixer end member, of supporting the non-driven end of the pre-mixer shaft (the right-hand end in FIG. 2B). As illustrated in FIG. 2A, the pre-mixer housing is releasably connected to a cylindrical sleeve member 48 extending outwardly from a support bushing 49 by a quick release-type clamping mechanism 50. These clamping mechanisms, which are well known to those skilled in the art, facilitate removal of the pre-mixer housing for cleaning purposes. As illustrated in FIG. 2B, the right-hand end of the pre-mixer housing 18 is releasably connected to the pre-mixer end member housing 54 also by a quick release-type clamping mechanism 51. As illustrated in FIG. 1, the lower portion of conduit 20 which is welded into the pre-mixer housing 18 is connected to the upper portion of conduit 20 by a set of screws which clamp together the flanges of the upper and lower portions of the conduit 20 between an O-ring.

Referring to FIG. 2B, the pre-mixer end member housing 54 includes a generally cylindrical portion with a shoulder 54A adapted to mate with the end of the pre-mixer housing 18 and a reduced diameter portion 54B which fits snugly within the endmost portion of the pre-mixer housing 18.

The pre-mixer end member portion 54B is generally cylindrical in shape and has a bearing surface 56 attached to its inner cylindrical surface. The end member portion 54B is preferably composed of stainless steel and the bearing surface 56 is preferably composed of bronze. As illustrated in FIG. 2B, the inside diameter of the bearing surface is slightly greater than the innermost diameter of the end member portion 54B so that the bushing 56 directly supports the pre-mixer shaft right-hand end portion 58 which is reduced in diameter from the pre-mixer shaft main portion. Because of the high rotational speed of the pre-mixer shaft, it must be securely supported in order to reduce shaft vibration. When the bearing surface 56 becomes worn, it is only necessary to weld a new bearing surface onto the inner surface of the end member portion 54B rather than having to replace the entire end member 54. A bearing assembly 60 is clamped against a sleeve bushing 62 which is fitted over the pre-mixer shaft outermost portion 64 which is reduced in diameter from the shaft end portion 58. The bearing assembly is held against the bushing 62 by a clamp 66 which is fastened to the shaft outermost portion by a screw. A removable end plate 68 is fastened to the end member housing 54.

When it is desired to remove the pre-mixer shaft 32 from the pre-mixer housing 18, it is only necessary to remove the quick release type clamping mechanism 51 and to pull the entire shaft end member assembly 54 from within the pre-mixer housing by handle 55 which is located on the end plate 68. The design of the pre-mixer of this invention thereby permits the pre-mixer shaft to be easily removed, cleaned and reinserted into the housing and, at the same time, be securely supported against vibration within the pre-mixer housing.

As previously stated, the pre-mixer shaft 32 consists of a longitudinally extending cylindrical body which extends through the pre-mixer housing 18 with the driven end of the shaft being keyed into an aperture 38 in bushing 40 and the non-driven end 58 of the shaft being supported by the pre-mixer end member 54.

Paddles generally designated 70 are welded onto the outer cylindrical surface of the pre-mixer shaft 32. The paddles consist both of a solid helical surface 71 and a plurality of segmented helical surfaces 72 which are spaced from one another. In the preferred embodiment, the paddle 71 is formed by generating a helical plane of approximately three revolutions about the outer surface of the pre-mixer shaft. The helical paddle 71 is formed at the beginning of the pre-mixer shaft 32 which is positioned beneath the chute 20 which transmits the flour and egg ingredients from the metering mechanism to the pre-mixer assembly. The purpose of the solid helical paddle 71 is to mix and convey these paste product ingredients to a position along the housing where water is added to the mixture through the port 16.

Figure 3:
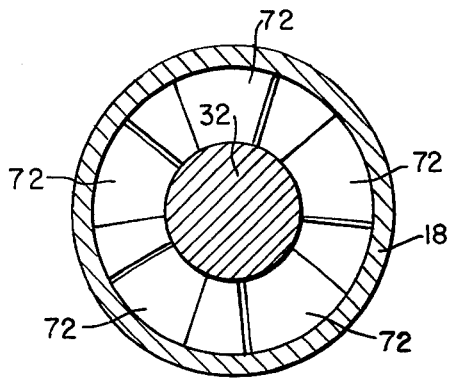
FIG. 3 is a cross-sectional view of a portion of the pre-mixer illustrated in FIG. 2A taken along the lines 3—3.
Figure 4:
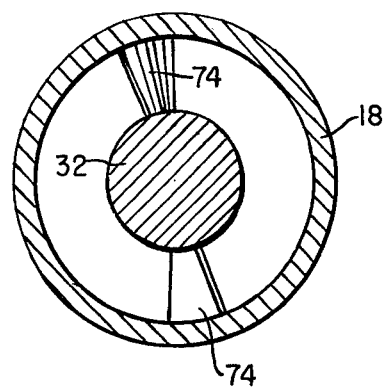
FIG. 4 is a cross-sectional view of the pre-mixer illustrated in FIG. 2A taken along the lines 4—4.

In the preferred embodiment, the paddles 72 are generally in the position which would be occupied by a helical plane if such a plane were generated about the pre-mixer shaft 32. However, instead of a solid helical plane such as paddle 71, only helical segments are formed about the surface of the shaft 32. The function of the segmented helical paddles 72 is to thoroughly mix the paste product ingredients and to further convey the paste mixture along the length of the conveyor housing to the output end adjacent the mixer 26. In the preferred embodiment, as illustrated in FIG. 3, there are approximately five paddles per revolution of the shaft 32 and approximately four revolutions of segmented paddles. The paddles 72 are spaced approximately 30° to 40° apart. Following the true revolution of a helix, the paddles 72 are naturally pitched or inclined to the right in the direction of flow movement. The separation of the paddles 72 reduces the flow rate and enhances the mixing from that achieved by the solid paddle 71.

One important feature of this invention is that the two end paddles 74 (which are partially illustrated in FIG. 2B), which are positioned directly adjacent the shaft outer end portion 58, are reversed in direction from the paddles 72. These last two paddles 74 are pitched or inclined so as to provide reverse flow of the mixture within the housing. These paddles are also smaller than the paddles 72 and are spaced approximately 180° apart. The paddles 74 are inclined so as to provide a reverse flow from the flow induced by the paddles 72, are spaced apart a greater distance than the paddles 72, and are smaller in size than paddles 72 in order to prevent clogging of the mixture at the end of the pre-mixer housing 18 adjacent the end wall 76 of the end member portion 54B. The paste product ingredients are mixed in the pre-mixer housing and conveyed along the housing to the output end from which the homogeneous mixture is transmitted through chute 28 to the mixer or blender 26. However, it has been found that the mixer tends to accumulate against the end member end wall 76 thereby causing clogging and jamming of the pre-mixer which can result in the motor burning out. The three reverse paddles 74 described above tend to reverse the flow of the homogeneous mixture against itself so that there is no accumulation of the mixture against the end wall 76. It has been found that this substantially reduces clogging in the pre-mixer.

Another aspect of this invention is that the paddles 72 are slightly offset from the position occupied by a true helical plane. In the preferred embodiment, the paddles 72 are rotated counterclockwise or opposite to the direction of the incline a few degrees (approximately 1 to 10 degrees) about the radial axis of the helical segments which they form in order to increase the clearance between the leading edge of one paddle and the lagging edge of the succeeding paddle. In this way, the distance between the paddles (measured along the longitudinal axis of the pre-mixer shaft) is increased thereby reducing the flow rate of the mixture. Since the size of the paddles remains the same, the degree of mixing the paste product ingredients receive is increased.

The pre-mixer housing 18 is of unitary construction and extends onto the pre-mixer end member 54 which supports the pre-mixer shaft for rotational movement. In view of the high rotational speed of the shaft, it is important to make the housing unitary and extend it over the pre-mixer end portion. It has been found that when the housing is segmented just before the conduit 28, severe vibrations are induced in the segmented portions of the housing even though they were connected together by a clamping mechanism.

In operation, the paste product ingredients are poured into the hopper 10 and are metered through the conduit 20 into the pre-mixer 14 by the metering mechanism 12. Water is added to the pre-mixer through port 16. The pre-mixer shaft 32 is rotated at approximately 1200 r.p.m. by the motor (not shown) in motor housing 22. The paddles 71 and 72 on the pre-mixer shaft 32 mix and convey paste product ingredients with the water to form a homogeneous mixture which is conveyed through the premixer housing 18 to the output exit conduit 28 which dumps the homogeneous paste product mixture into the mixer or blender 26 where it is worked or kneaded by the mixer paddles 30 into a uniform consistency.

While the preferred embodiment of various aspects of the invention has been shown in the drawings, it is to be understood that this disclosure is for the purpose of illustration only and that various changes in shape, proportion and arrangement of parts, as well as the substitution of equivalent elements for those herein shown and described, may be made without departing from the spirit and scope of the invention as set forth in the appended claims.

What is claimed is:

1. Apparatus for pre-mixing alimentary paste ingredients comprising: a longitudinally extending, unitary housing having first and second ends; a longitudinally extending shaft having first and second ends being positioned within said housing; a motor; means for connecting the output of said motor to said shaft first end including a rectangular projection being formed on said shaft first end, a cylindrical bushing having a rectangular keyway formed therein, said bushing being positioned directly adjacent said shaft first end; means for supporting said shaft second end for rotational movement; said unitary shaft extending at least as far as said shaft second end supporting means, a first paddle being formed on said shaft adjacent said shaft first end, said first paddle being the shape of a solid helical plane generated about the outer surface of said shaft, said first paddle being inclined so as to induce flow toward said shaft second end, a plurality of second paddles being formed on said shaft, said second paddles comprising helical segments spaced about the outer surface of said shaft, said second paddles being inclined so as to induce flow toward said shaft second end.

2. In an apparatus for pre-mixing alimentary paste ingredients including a longitudinally extending housing having first and second ends, a longitudinally extending shaft having first and second ends being positioned within said housing, a motor to drive said shaft, and means for connecting the output of said motor to said shaft first end, the improvement comprising said connecting means including a rectangular projection being formed on said shaft first end, a cylindrical bushing having a rectangular keyway formed therein, said bushing being positioned directly adjacent said shaft first end.

3. The improvement recited in claim 2, said bushing being composed of plastic material and said shaft being composed of stainless steel.

4. Apparatus for pre-mixing alimentary paste ingredients comprising: a longitudinally extending, unitary housing having first and second ends; a longitudinally extending shaft having first and second ends being positioned within said housing; a motor; means for connecting the output of said motor to said shaft first end; means for supporting said shaft second end for rotational movement including an end member composed of a generally cylindrical portion having an end wall and a shoulder member formed thereon, said end member cylindrical portion being positioned within said housing adjacent said housing second end, said end member shoulder portion mating with said housing second end, said shaft second end supporting means being located in said end member cylindrical portion and including a bearing surface welded onto the inner surface of said end member cylindrical portion, said bearing surface and said shaft being composed of dissimilar metals, said unitary shaft extending at least as far as said shaft second end supporting means, a first paddle being formed on said shaft adjacent said shaft first end, said first paddle being the shape of a solid helical plane generated about the outer surface of said shaft, said first paddle being inclined so as to induce flow toward said shaft second end, a plurality of second paddles being formed on said shaft, said second paddles comprising helical segments spaced about the outer surface of said shaft, said second paddles being inclined so as to induce flow toward said shaft second end, a plurality of third paddles being formed on said shaft directly adjacent said end member cylindrical portion end wall, said third paddles being inclined so as to induce flow toward said shaft first end and prevent clogging of the alimentary paste mixture at said end wall.

5. Apparatus for pre-mixing alimentary paste ingredients comprising: a longitudinally extending, unitary housing having first and second ends; a longitudinally extending shaft having first and second ends being positioned within said housing; a motor; means for connecting the output of said motor to said shaft first end; means for supporting said shaft second end for rotational movement; said unitary shaft extending at least as far as said shaft second end supporting means, a first paddle being formed on said shaft adjacent said shaft first end, said first paddle being the shape of a solid helical plane generated about the outer surface of said shaft, said first paddle being inclined so as to induce flow toward said shaft second end, a plurality of second paddles being formed on said shaft, said second paddles comprising helical segments spaced about the outer surface of said shaft, said second paddles being inclined so as to induce flow toward said shaft second end, a plurality of said helical segments being rotated approximately 1 to 10 degrees about the radial axis of each helical segment in a direction opposite to the direction of incline of said helical segments.

* * * * *